Aug. 18, 1970     D. J. MEARS     3,524,284

ABRASIVE MILLING HEAD FOR NUMERICALLY CONTROLLED APPARATUS

Filed Aug. 22, 1967     2 Sheets-Sheet 1

INVENTOR.
DANIEL J. MEARS
BY Charles W. Gregg
AGENT

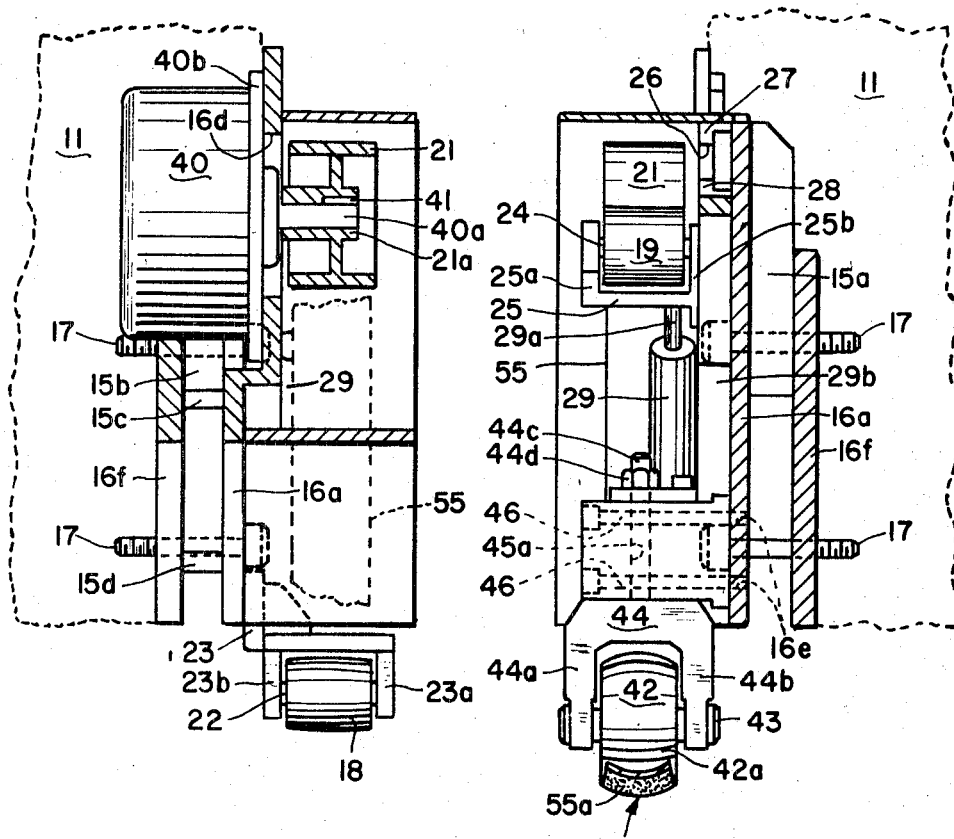
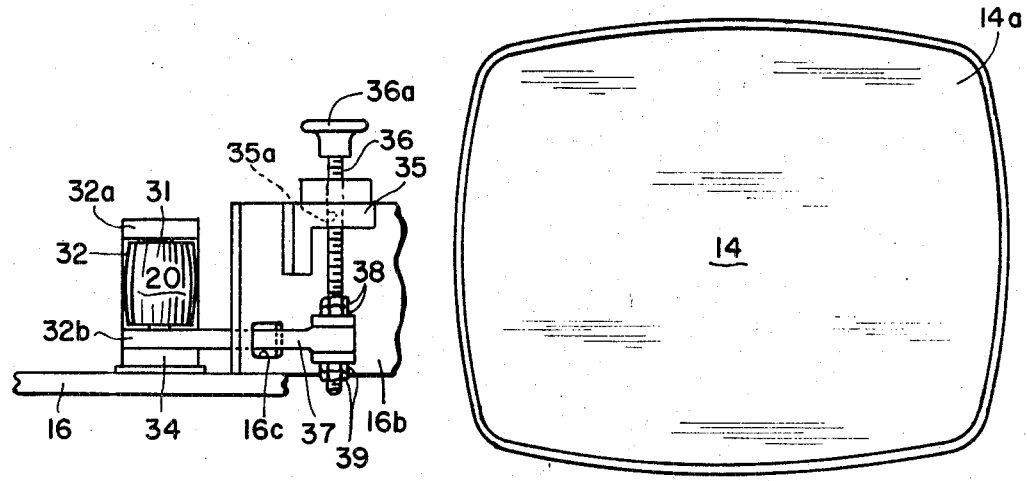
Fig. 4 Fig. 5 Fig. 6 Fig. 7 Fig. 8
INVENTOR.
DANIEL J. MEARS
BY
AGENT United States Patent Office 3,524,284
Patented Aug. 18, 1970

3,524,284
ABRASIVE MILLING HEAD FOR NUMERICALLY CONTROLLED APPARATUS
Daniel J. Mears, Horseheads, N.Y., assignor to Corning Glass Works, Corning, N.Y., a corporation of New York
Filed Aug. 22, 1967, Ser. No. 662,342
Int. Cl. B24b 21/12, 21/08
U.S. Cl. 51—135
6 Claims

ABSTRACT OF THE DISCLOSURE

An abrasive milling head for mounting on a machine automatically movable through three axes of motion in response to control signals representing numerical control information, such milling head for precisely abrasively milling generally convexly curved surfaces on workpieces in accordance with numerical control information pertaining to the shapes of said surfaces and control signals progressively supplied to said machine in response to recorded programs representing said information.

BACKGROUND OF THE INVENTION

The present invention relates to the field of art of numerical control of milling machinery or apparatus and more specifically to an abrasive milling head for mounting on a machine responsive to a progression of signals produced from the read-out of a recorded program of numerical control information. When the milling head is mounted on the milling machine, said information may, for example, relate to a shape of or contours to be milled on a generally convexly curved surface on a workpiece and the signals supplied to said machine, and produced from such information, direct the movement of the machine through three axes of motion or three-dimensional paths for the grinding or abrasive milling of said shape or contours on said surface on said workpiece by the milling head.

Numerical control of milling apparatus or milling machine tools, although a recent development, is now a relatively wellknown field of art and many milling machines which are automatically operated in accordance with numerical control information are available. However, such milling machines are usually provided with milling heads employing rotary cutters such as bits for the rough shaping of workpieces and, following such shaping, substantial and milling of the workpieces must still be performed.

As an example, plungers used for the press forming of glass viewing panels for rectangular color television picture tubes have generally convexly curved glass-contacting surfaces whose shapes or contours must not have deviations greater than a maximum allowable deviation of approximately 0.004 inch from set standards for said shapes. While said surfaces on the plungers can be and are often roughly cut by rotary cutters operated in response to numerical control information pertaining to such surfaces, considerable and skillful hand grinding of the surfaces must be performed, following the rough cutting thereof, to provide shapes thereon which do not exceed said permissible deviations. As is obvious, such hand grinding requires a high degree of skill, is time consuming and is, therefore, a relatively expensive operation. Accordingly, the apparatus of the present invention was developed to eliminate said cutting and hand grinding operations by providing an abrasive grinding or milling head which is operated in response to numerical control information pertaining to shapes of generally convexly curved surfaces desired on workpieces such as glass pressing plungers and similar articles. The milling head can grind or mill such curved surfaces to within 0.002 inch of prescribed standards for the shapes of such surfaces and, insofar as is known, no similar apparatus operated by a numerical control system has heretofore been known.

While, as previously mentioned, numerical control systems are now relatively well known, if additional information relating to such systems is desired, reference may be made to the book entitled "Numerical Control in Manufacturing" published by the McGraw-Hill Book Company, Inc., New York, N.Y. Such book may be found in the Library of Congress under Catalog Card No. 63-15105.

SUMMARY OF THE INVENTION

The invention herein disclosed comprises an abrasive milling or grinding head for mounting on a milling machine which is reciprocatively movable through three axes of motion each such axis being perpendicular to the others of such axes and said movement of such machine being in response to control signals supplied to said machine from recordings of motion commands interpolated from numerical control information representing programs of motion for such a machine. Said milling head is used for precisely milling a curved surface on a workpiece in accordance with control signals supplied to said machine and representative of numerical control information pertaining to such curved surface. The milling head per se comprises a flexible abrasive belt which is looped about a plurality of rollers or wheels for movement of the belt through a selected path of travel. One of the rollers or wheels is provided with an outer peripheral shape with which an area of said belt is forced into conformity for milling of said surface, said peripheral shape having the form of a segment of a sphere or spherical body with a radius selected in accordance with the curvatures of said surface. The numerical control program pertaining to said surface is developed according to said selected radius of said spherical body. The invention will best be understood with reference to the accompanying drawings and description of the invention.

BRIEF DESCRIPTION OF THE DRAWINGS

In the drawings:
FIG. 4 is an end cross-sectional view of the apparatus of FIG. 1 taken generally along line 4—4 of such drawing figure;
FIG. 5 is a view similar to FIG. 4 but taken generally along line 5—5 of FIG. 1;
FIG. 6 is a detailed view of a part of the apparatus of FIG. 1 taken generally along line 6—6 of FIG. 1;
FIG. 7 is a top plan view of the workpiece shown in FIGS. 1, 2 and 3 and completes the illustration of the general overall configuration of said workpiece;
and
FIG. 8 is a view showing a spherical body for purposes of illustration and discussion of various shapes which a part of the apparatus of the invention may have.

Similar reference characters refer to similar parts in each of the figures of the drawings.

DESCRIPTION OF THE PREFERRED EMBODIMENT

Figure 1:
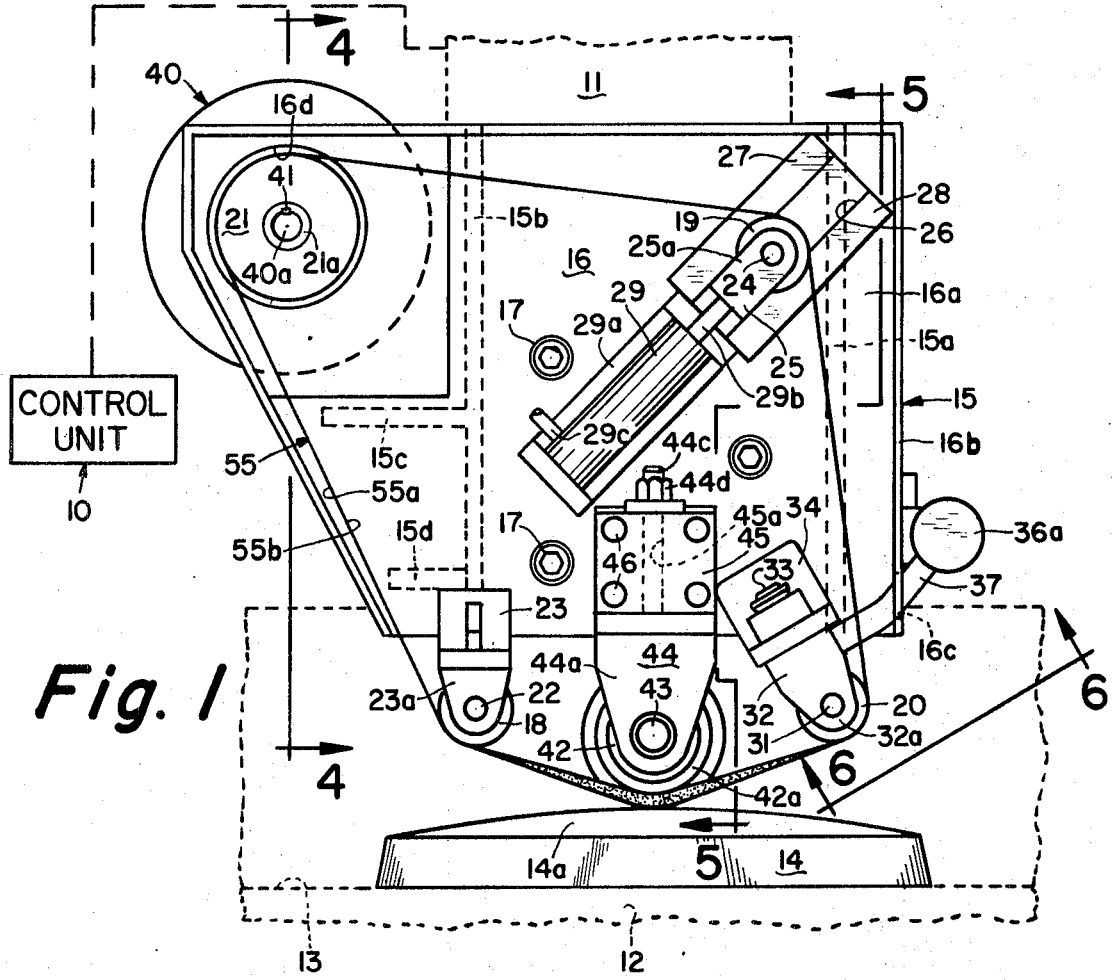
FIG. 1 comprises a front elevational view of the milling head embodying the invention and attached to a numerically controlled milling machine of a type known in the art.

Referring to FIGS. 1, 4 and 5 of the drawings in detail, the milling head 15 of the present invention includes a main support means or member 16, including first and second upright back plates 16a and 16f, and adapted for mounting, as by suitable bolts such as 17 to a milling machine 11 in the place of the usual rotary cutter milling head mounted on such a machine. Milling machine 11 may, for example, be the type including a stationary workpiece support table 12 having a workpiece support surface 13. Spacer members 15a, 15b, 15c and 15d are welded to the back and front surfaces of back plates 16a and 16f, respectively, of support member 16 for suitable spaced attachment of head 15 to milling machine 11. Machine 11 may, for example, be a Turchan Hydro-Mill which is movable, in response to numerical control signals supplied thereto from a control unit 10, through or along three axes of motion extending perpendicular to each other. A first of such axes extends perpendicular to said workpiece support surface 13 of machine 11 and a second of such axes extends in a direction longitudinally aligned with such support surface and parallel therewith. It is obvious, therefore, that the third of such axes extends transverse to support surface 13 and parallel therewith. It is expedient to point out at this point in the description that, although the invention is described as adapted for mounting on a Turchan Hydro-Mill in place of the usual rotary cutter head mounted on such machine, the abrasive milling head could as well be mounted on any similar milling machine or a milling machine in which the workpiece support table, rather than the milling head, moves through or along said three axes of motion for the milling of workpieces. Turchan Hydro-Mills such as that mentioned are manufactured and sold by Turchan Follower Machine Company whose address is 26950 Vanborn Road, P.O. Box 157, Inkster, Mich.

Figures 2, 3:
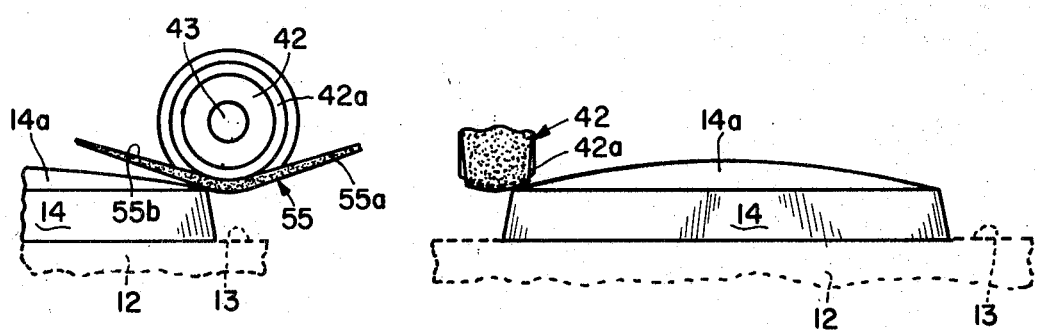
FIGS. 2 and 3 are views illustrating the operation of the milling head of FIG. 1 when milling selected areas of a generally convexly curved surface of a workpiece.

As shown in FIGS. 1, 2 and 3 of the drawings, a workpiece 14, including a roughly formed and convexly curved top portion 14a, is disposed on workpiece support surface 13 of workpiece support table 12 of milling machine 11. Workpiece 11 may, as previously mentioned, comprise a plunger for press forming gobs of molten glass, supplied to a cooperative female mold, into viewing panels for rectangular color television picture tubes. In such case, the curved portion 14a of the workpiece must be precisely milled to provide a generally convexly curved surface thereon which will precisely form the internal surfaces of said viewing panels so that, upon cooling of such panels, such internal surfaces will conform, within maximum allowable deviations from prescribed standards for the curvatures for said internal surfaces, to such standards. Such deviations may, for example, be on the order of 0.004 inch as also previously mentioned. In order that said internal surfaces of said viewing panels will, upon cooling of the panels, conform to said prescribed standards, the generally convexly curved surface to be milled on portion 14a of a pressing plunger such as 11 includes areas which have slightly or somewhat concave curvatures. This is necessitated because the shapes of said viewing panels including said internal surfaces thereof, upon cooling of such panels, become distorted from the shapes originally imparted thereto during the press forming of the panels. The apparatus of the present invention is, therefore, intended for use in automatically precisely milling generally convexly curved surfaces on workpieces such as 14. However, as mentioned above, such a generally convexly curved surface may include areas having slightly or somewhat concave curvatures and, as a specific example of the utility of the invention, the apparatus is described for use in milling a workpiece, such as 14, which may be a glass pressing plunger of the type discussed. It is pointed out, however, that the apparatus of the present invention is not intended to be confined only to use only in milling glass pressing plungers but may be used in milling curved surfaces on other types of workpieces.

The milling head of the present invention further includes three rotatable wheels, or rollers 18, 19 and 20 which are mounted on the face of back plate 16a of main support means or member 16. Roller or wheel 18 is rotatably supported on an axle 22 which extends through and between bifurcations 23a and 23b of a bifurcated support bracket 23 secured to back plate 16a in any suitable manner such as by welding, for example.

Roller or wheel 19 is rotatably supported on an axle 24 which extends through and between bifurcations 25a and 25b of a bifurcated support bracket 25. Bracket 25 is slidably mounted in a slideway 26 provided between two suitable slideway members 27 and 28, secured to the face of back plate 16a of support means 16 as by welding, for example. A pressurized fluid cylinder 29, including a base 29a, the usual piston rod 29b, and a fluid conduit 29c connected to the cylinder for supplying pressurized fluid to the lower end thereof, is secured to face 16a of support means 16 as by the welding of said base 29a to such face. The otherwise free end of piston rod 29b is welded to bracket 25. The purpose of the arrangement of bracket 25 and its associated apparatus will be discussed hereinafter in the description.

Roller 20 is rotatably mounted on an axle 31 extending through and between bifurcations 32a and 32b of a bifurcated support bracket 32. Bracket 32 is pivotally attached by a suitable pivot pin or axle 33 to an L-shaped bracket 34 which is welded to face 16a of support member 16 (FIGS. 1 and 6). There is attached to the ouside surface of a side portion 16b of support member 16 an L-shaped bracket 35 embodying a threaded hole 35a through which is screwed the threaded portion of an adjustment screw 36 having a knob portion 36a for manual gripping and turning of the adjustment screw. The otherwise free end of screw 36 extends through one end of an actuating arm 37 and is locked thereto by two pairs of lock nuts such as 38 and 39 screwed onto the threads on screw 36 and locked against opposite faces of said one end of actuating arm 37. The other end of actuating arm 37 extends through a hole 16c embodied in said side portion 16b of support member 16 and is secured to bifurcation 32b of bracket 32 by welding. It is apparent, therefore, that the turning of adjustment screw 36 will cause bracket 32 to pivot about its pivot pin 33 for linear adjustment of roller 20.

A fourth roller, or roller member or wheel 21 is rotatably mounted on the output shaft 40a of an electric motor 40 in a driven relationship therewith. Roller 21 is keyed to shaft 40a by a key 41 inserted into cooperative channels provided in the outer periphery of such shaft and the inner periphery of a hub portion 21a of roller 21. Motor 40 is secured to the back surface of back plate 16a of support member 16 as by the welding of a flange portion 40b of the motor to said surface. Shaft 40a of the motor extends through a hole 16d provided in such back plate and, thus, roller 21 mounted on such shaft is located in front of the face of back plate 16a of member 16.

A fifth roller, or roller member, or wheel 42 is rotatably supported on an axle 43 extending between and through bifurcations 44a and 44b of a bifurcated support bracket 44. A relatively sturdy bracket support block 45 is firmly secured to the face of back plate 16a of support member 16 by bolts such as 46 extending through suitable holes embodied in and extending through such support block. The threaded ends of the bolts such as 46 are screwed into cooperative threads provided in suitable holes such as 16e provided in said back plate 16a. Support block 45 embodies a hole 45a extending vertically therethrough and through which extents a pivot pin 44c which is secured to the upper surface of support bracket 44. The upper end of pivot pin 44c is threaded and a nut 44d is screwed onto such threads and tightened to securely hold said upper surface of bracket 44 in contact with the lower surface of support block 45. The position of support bracket 44 can be manually adjusted by loosening nut 44d and, following the desired adjustment of bracket 44, retightening such nut.

The outer circumference of roller or wheel 42 is preferably intimately surrounded by a tire or rim 42a of a material having a minute degree of resiliency, such tire or rim being formed on said outer circumference of wheel 42 substantially integrant with the remainder of the wheel. When wheel 42 is provided with said tire or rim, the material of said tire or rim may, for example, be rubber having a 90 durometer hardness. However, regardless of whether rim or tire 42a is provided about the outer circumference or periphery of wheel 42, the overall shape of the wheel, with or without the tire or rim, is an important feature of the invention as discussed below.

Referring to FIGS. 1, 2, 3 and 5 of the drawings it will be apparent that wheel or roller 42 has the shape of the center segment of a spherical body. That is to say, the outer peripheral surface of rim 42a of wheel 42 has a curvature transverse the width of such rim and extending from one face to the other face of wheel 42, indentical to the curvature of the largest circumference of said outer peripheral surface of rim 42a. Stated in still another manner, the radius of curvature of the outer surface of rim 42a of wheel 42, as illustrated in FIGS. 3 and 5 is, identical to the radius of curvature of the outer circumference of wheel 42 as illustrated in FIGS. 1 and 2. Such radii of roller or wheel 42 is also an important feature of the invention as pointed out hereinafter.

While wheel 42 is illustrated in the drawings as having the form of the center segment of a spherical body, such wheel can in practice have the shape of a complete spherical body, or other portions of such a body, other than just the center segment thereof, as long as such center segment is included in each respective such portion of the spherical body. This will best be understood by reference to FIG. 8 of the drawings which illustrates a spherical body 50 having an axis of rotation 50c, a radius corresponding to that of wheel 42, and a center segment 50a having the same overall shape as wheel 42. The axis of rotation of axle 43 coincides with the axis of rotation 50c of body 50, and, therefore, passes through the center point P of such body. A plane 50b extends through the center point P of body 50 perpendicular to said axes of rotation of body 50 and axle 43. Segment 50a of body 50 is illustrated as extending for equal distances on each side of plane 50b, that is, as extending between two planes 50d and 50e parallel with said plane 50b, but said distances can be different than those illustrated. For example, wheel 42 could comprise the segment or the portion of spherical body 50 which, referrring to FIG. 8, is to the right of plane 50d. Similarly, wheel 42 could comprise the segment or portion of spherical body 50 which is to the left of plane 50e. Furthermore, wheel 42 could comprise segments of spherical body 50 which are larger than but similar to those discussed. However, bifurcated support bracket 44 must, of course, be modified to support wheels which are similar to wheel 42 but comprise a larger portion of a spherical body than a center segment thereof as illustrated. It is believed that this will be readily apparent in the light of the foregoing discussion.

Referring further to FIGS. 1 through 5 of the drawings and with special reference to FIG. 1, a flexible belt 55 in the form of a loop, that is, a so-called endless belt is disposed or looped about portions of the outer peripheries or rims of wheels or rollers 18, 19, 20, 21 and 42 in a closed loop path of travel. There is provided on the outer surface 55a of said belt, that is, the surface thereof on the outside of said loop, an abrasive material which may, for example, be aluminum oxide, a well-known abrasive. Belt 55 is of a length substantially corresponding to the length of said closed loop path of travel and, following the positioning of the belt about said portions of the outer peripheries or rims of said rollers and in said path of travel, pressurized fluid is suppled to fluid conduit 29c connected to cylinder 29 to actuate the piston of such cylinder and, thereby, piston rod 29b of the cylinder, and bracket and roller member 19, in a direction to supply and maintain tension on belt 55 and cause the portion of the belt, which loops about said portion of the outer periphery or rim of wheel member 42, to closely conform to such portion or rim of the wheel. That is to say, said actuation of piston rod 29b biases roller member 19 in a direction to supply tensional force to belt 55 and draw, stretch and distort the area of the belt contacting said portion of said outer periphery, rim or circumference of wheel 42 into close conformity with the shape of such outer periphery, rim or circumference. When it is desired to change belt 55, or to remove it for other reasons, the supply of pressurized fluid to fluid conduit 29c is interrupted and such conduit is connected to a suitable fluid sink. Piston rod 29b and roller member 19 can then be actuated in a direction to release the tension on belt 55 and such belt can then be removed from about said rollers and replaced with a new belt. Said fluid sink, the source of supply of said pressurized fluid and the valve for controlling the flow of said pressurized fluid are not shown in the drawings for purposes of simplification thereof.

The arcuate portion of the outer periphery or rim of wheel 42 contacting or contacted by belt 55 as a result of the aforementioned stretching and distortion of such belt about such portion of wheel 42 is an important feature of the apparatus of the invention. Furthermore, as previously mentioned, the radius of the spherical body, of which roller member or wheel 42 is a portion, is also an important feature of the apparatus disclosed. It is believed that the factors upon which the selection of said arcuate portion and said radius depend will be understood from the following discussions.

At each point in time during the milling of a generally convexly curved surface, such as that previously discussed, on the top of a portion of a workpiece, such as the top of portion 14a of workpiece 14, belt 55 must contact the top surface of such top portion only at a point tangential to such top surface, otherwise precise milling of said generally convexly curved surface on the top portion 14a of workpiece 14 cannot be attained. Therefore, the radius of the spherical body, of which roller or wheel 42 comprises at least a portion, must be smaller than the radius of the smallest concave curve of said generally convexly curved surface to be milled on said workpiece, that is, smaller than the radius of the concave curve having a greater curvature or a larger rate of change of direction than any other concave curve to be milled on said surface. Stated in other words, the radius of wheel or roller member 42 must be smaller than the radius of the smallest concave curve to be milled on said curved surface; otherwise, at each of certain points in time during milling of said surface, belt 55 will contact such surface at points other than one of said points tangential to the surface.

With further consideration of the milling of said surface only at points tangential thereto as discussed above, the angular measurement of the arcuate portion of the outer periphery or rim of wheel or roller member 42 contacting or contacted by belt 55 must be at least equal to the angular measurement of the largest arc of said surface to be milled on said workpiece. That is to say, the smallest arc of the area of wheel 42 contacting or contacted by inner surface 55b of belt 55 must be equal to or greater than the largest arc of said surface to be milled on said workpiece. Therefore, referring to FIGS. 1 and 3 of the drawings, the width of belt 55 is selected (FIG. 3) and roller members or wheels 18, 20 and 42 are mounted on back plate 16a of support member 16 so that, when belt 55 is stretched about said members as previously mentioned, inner surface 55b on the inside of the loop of the belt is contacted by or contacts an area of the outer peripheral surface of wheel or member 42 which has an angular measurement, in each direction diametrically across such area, at least equal to and preferably greater than the angular measurement of the largest arc of said surface to be milled on said workpiece. Otherwise, the milling of said surface at points tangential thereto will not always be attained.

It is pointed out that the outer peripheries or rims of rollers or roller members 18 and 20 preferably have convex curvatures across the width of such rims and from face-to-face of the respective members as illustrated in FIGS. 4 and 6 of the drawings, respectively. Such rims have, therefore, transverse curvatures similar to that of the rim of wheel 42 but of a lesser curvature than the latter rim. Such transverse curvatures of the rims of rollers 18 and 20 aid belt 55 to conform to the shape of the arcuate portion of the rim of wheel 42 contacting or contacted by belt 55 and, at the same time assure optimum tracking of such belt on said rollers during movement of the belt through its loop path of travel about said rollers.

Having thus described in detail the apparatus embodying the invention, a brief operational example of the invention will now be set forth.

Assuming that belt 55 is disposed about rollers, wheels or roller members 18, 19, 20, 21 and 42 as illustrated in FIG. 1, and that pressurized fluid is constantly supplied to fluid conduit 29c to actuate piston rod 29b and, thereby, support bracket 25 and roller member 19 in a direction to draw belt 55 into close conformity with the lower arcuate portion of roller member or wheel 42, workpiece 14 is positioned on the workpiece support surface 13 of workpiece support table 12 with the portion 14a of workpiece 14 upwardly disposed so that a desired generally convexly curved surface can be milled on the top of such portion 14a. Workpiece 14 is precisely positioned and clamped, in any convenient manner, on said surface 13 according to a reference point or reference center selected for the start of the milling of the desired surface on such workpiece, such reference center corresponding to a starting point for a progression of control signals to be supplied to machine 11 for actuation of such machine in accordance with the read-out of a recorded program representing numerical control information pertaining to the desired surface to be milled on workpiece 14. The control signals are supplied to machine 11 by the previously-mentioned control unit 10 which may, for example, be a control unit of the continuous path numerical control system manufactured and sold by the Industrial Controls Division of the Bendix Corporation under the name of DirectaPath. Such control system is described in a bulletin BICD 267-7-5-100 of said division and, if additional information pertaining to the control system is desired, a copy of such bulletin may be obtained by writing to Bendix Industrial Controls Division, 8880 Hubbell Ave., Detroit, Mich. 48228. However, said control system per se, as well as control unit 10, forms no part of the present invention and numerous other numerical control systems can be employed for the control of machine 14 in accordance with numerical control information pertaining to surfaces to be milled by the abrasive milling head 15 of the present invention.

Following the required precise positioning of a workpiece such as 14 on said workpiece support surface 13, motor 40 is energized from a source of electrical power having a voltage and capacity suitable for the energization of such motor. Such source of power is not shown in the drawings for purposes of simplification thereof.

The energization of motor 40, as mentioned above, causes rotation of the output shaft 40a of the motor and of wheel, roller, or roller member 21 mounted on said shaft. The driven rotation of roller 21, in turn, causes driven movement of belt 55 through its loop path about rollers, wheels or roller members 18, 19, 20, 21 and 42 while roller 19 maintains such belt under tension to cause it to conform to said arcuate portion of wheel or roller 42 as previously discussed. During the driven movement of belt 55, any elongation of the belt by stretching thereof is taken up by further lateral movement of roller 19 in response to the force of the pressure of the pressurized fluid continuously supplied to cylinder 29 through fluid conduit 29c.

After belt 55 has attained full speed of movement through its said loop path, control unit 10 is activated to begin to supply said control signals to machine 11 which then moves, in response to such control signals, through one or more of the previously-mentioned three axes of motion of such machine to cause the abrasive milling head 15 to mill the desired surface on the workpiece such as 14 precisely positioned on the workpiece support surface 13 of workpiece support table 12.

While the abrasive milling head 15 of the present invention is discussed herein as being backfitted or retrofitted, in the place of the usual rotary cutter head, to a numerically controlled machine of the type which moves its milling head for milling of workpieces, milling head 15 can as well be mounted on a milling machine of the type in which the workpiece support table moves through three axes of motion for the continuous milling of workpieces. Furthermore, the abrasive milling head 15 of the present invention can be mounted on new milling machines in place of the usual rotary cutter heads provided on such machines. This is, of course, relatively obvious.

Although there is herein shown and described only one form of apparatus embodying the invention, it is to be understood that various changes and modifications may be made in the apparatus within the scope of the appended claims without departing from the spirit and scope of the invention.

What is claimed is:

1. A milling head for abrasively milling a curved surface on a workpiece, such head for attachment to a milling machine subject to control by signals supplied thereto and representing numerical control information pertaining to said surface, said machine including a table having a surface for support of said workpiece; said head comprising,
   (A) a main support means for attachment of the head to said milling machine in a preselected attitude above said workpiece support surface;
   (B) an endless abrasive milling belt;
   (C) a plurality of roller members similarly rotatably mounted on said support means with their axes of rotation extending parallel with said support surface, said belt tensively looped about arcuate portions of the outer peripheries of such roller members;
   (D) a wheel member rotatably mounted on said support means with its axis of rotation parallel with said axes of rotation of said roller members, said belt also tensively looped about an arcuate portion of the outer periphery of such wheel member above said curved surface of said workpiece when such workpiece is disposed on said workpiece support surface, said wheel member having a configuration of the center segment of a sphere whose radius is selected in accordance with the curvatures of said curved surface of said workpiece so that the area of the surface of said belt opposite the area of the surface thereof contacting said arcuate portion of said wheel member can contact only a point tangential to said curved surface at any selected point in time during the subsequent milling of such surface by said belt;
   (E) means for biasing one of said members in a direction to supply to and maintain tension on said belt and cause the portion of the belt looped about said arcuate portion of said outer periphery of said wheel member to closely conform to such arcuate portion; and
   (F) motor means connected to one of said members for driven rotation of such member and driven movement of said belt through the path of its loop about said outer peripheries of said members.

2. A milling head in accordance with claim 1 and in which at least the roller member which immediately precedes said wheel member in the direction of said driven movement of said belt through the path of its loop about said outer peripheries of said members has a convexly curved transverse contour across the width of the outer peripheral surface of such roller member to aid the area of said belt looped about said arcuate portion of said wheel member to conform to the curvatures of such arcuate portion.

3. In combination with a milling machine actuable through three-dimensional paths in response to control signals supplied thereto, an abrasive milling head for milling a curved surface on a workpiece to precise contours in response to a progression of control signals supplied to and selectively directing said machine through said paths in accordance with a recorded program of numerical control information producing said signals and representing contours desired for said surface, said machine including a stationary table for support of said workpiece, said milling head comprising:

(A) a support member for attaching the milling head to said milling machine in a selected attitude;

(B) a flexible belt in the form of a closed loop and including abrasive material on the outer surface of said belt on the outside of said loop;

(C) a plurality of rollers rotatably mounted on said support member for support of said belt with the inner surface of such belt on the inside of said loop contacting portions of the outer peripheries of such rollers;

(D) a wheel rotatably mounted on said support member, the rim of such wheel having a selected circumference and a selected convexly curved contour transverse the width of such rim and curving uniformly from face-to-face of the wheel, both said circumference and said contour having sharper curvatures than the sharpest curvatures of said convexly curved surface to be milled on said workpiece, said wheel mounted on said support member with at least an arcuate portion of said circumference of said rim contacting a selected area of said inner surface of said belt and forcing a corresponding area on said outer surface of such belt to a position nearer to said table of said machine, than any other area of such outer surface;

(E) a motor for driving said belt through a closed loop path of travel; and (F) means for tensioning said belt and drawing said area of the belt contacted by said arcuate portion of said circumference of said rim into close conformity with such arcuate portion.

4. A milling head in accordance with claim 3 and in which at least the roller which immediately precedes said wheel in the direction of movement of said belt through said closed loop path of travel has a convexly curved transverse contour across the width of the outer peripheral surface of such roller to aid said area of the belt contacted by said arcuate portion of said circumference of said rim to conform to the transverse curvature of such portion of such circumference.

5. An abrasive milling head for mounting on a milling machine including a work table having a workpiece support surface and reciprocatively movable along three axes of motion perpendicular to each other, a first of such axes extending perpendicular to said support surface and a second of such axes longitudinally aligned with such support surface parallel therewith, said movement being in response to control signals supplied to said machine from recordings of motion commands interpolated from numerical control information representing programs of motion for such a machine, said milling head for precisely and progressively abrasively milling a curved surface on a workpiece in accordance with control signals supplied to said machine and representative of numerical control information pertaining to such curved surface, said workpiece precisely positioned on said support surface for the milling of such workpiece, and said milling head comprising:

(A) main support means for attachment of the milling head to said milling machine;

(B) a rotatable member rotatably mounted on said support means with the axis of rotation of such member extending parallel with the third axis of said three axes of motion, such member comprising,
 (a) at least a portion of a spherical body through whose center said axis of rotation extends,
 (b) such portion including a segment of said spherical body extending a distance on each side of a plane extending perpendicular to said axis of rotation and through the center of such spherical body,
 (c) said member mounted on said support means with a selected arcuate part of the outer periphery of said segment of said spherical body located nearer to said workpiece support surface of said work table than any other part of such segment and the arc of said arcuate part being at least as large as the greatest arc of said curved surface to be milled on said workpiece, and
 (d) the radius of said member being at least as small as the radius of the smallest concave curve of said curved surface to be milled on said workpiece;

(C) a plurality of spaced-apart roller members rotatably mounted on said support means with the axes of rotation of such roller members extending parallel with said axis of rotation of said rotatable member and spaced from the outer surface of such member laterally and in a direction away from said workpiece support surface of said work table;

(D) a flexible closed loop belt looped about and having its inner surface contacting parts of the outer peripheries of said roller members and said selected arcuate part of the outer periphery of said segment of said spherical body with the center line of the belt substantially aligned with the circumference of said plane extending through the center of said spherical body, such belt including an abrasive material on the outer surface thereof;

(E) means for supplying tension to said belt and forcing the part of such belt contacting said selected arcuate part of said outer periphery of said segment of said spherical body into close conformity with such arcuate part; and (F) motor means connected to one of said members for driven rotation thereof and driven movement of said belt through its loop about said outer peripheries of such members.

6. An abrasive milling head for mounting on a milling machine movable through three axes of motion perpendicular to each other and in response to control signals supplied to such machine from recordings of motion commands interpolated from numerical control information representing programs of motion for the machine, said head for precisely and progressively abrasively milling a generally convexly curved surface on a workpiece in accordance with control signals supplied to said machine and representative of numerical control information pertaining to such surface, said machine including a workpiece table having a surface for support of said workpiece thereon; said milling head comprising:

(A) a main support member for attachment of the head to said milling machine;

(B) a flexible closed loop belt having on the outer surface thereof an abrasive material;

(C) a plurality of wheels rotatably mounted on said main support member and supporting said belt for movement through a closed loop path of travel, the rim of one of said wheels having a selected circumference and a selected uniform convex contour transverse the width of such rim and from face-to-face of such wheel such that the curvatures of said rim are more abrupt than the most abrupt curvatures of said curved surface to be milled on said article, and said one wheel rotatably mounted on said support member with an arcuate portion of said circumference of said rim contacting a selected area of said belt and forcing a corresponding area on said outer surface of the belt to a position nearer to said workpiece support surface than any other area of such outer surface;

(D) means for supplying tension to said belt and forcing said selected area of such belt into close conformity with said transverse contour of said rim of said one wheel; and (E) motor means connected to one of said wheels for driven rotation thereof and driven movement of said belt through said closed loop path of travel for milling said curved surface on said workpiece.

References Cited

UNITED STATES PATENTS

| 2,883,110 | 4/1959 | Spencer et al. | 235—189 |
| 3,270,186 | 8/1966 | Centner | 235—151.11 |
| 3,335,528 | 8/1967 | Bader | 51—148 |

OTHELL M. SIMPSON, Primary Examiner

U.S. Cl. X.R.

51—141, 148